United States Patent
Koseoglu

(10) Patent No.: US 11,732,204 B2
(45) Date of Patent: Aug. 22, 2023

(54) SYNGAS PRODUCTION AND RECOVERY OF ACTIVE PHASE METALS FROM GASIFIER SLAG CONTAINING SPENT CATALYST

(71) Applicant: SAUDI ARABIAN OIL COMPANY, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 932 days.

(21) Appl. No.: 16/672,837

(22) Filed: Nov. 4, 2019

(65) Prior Publication Data

US 2021/0130718 A1    May 6, 2021

(51) Int. Cl.
| | |
|---|---|
| *C10J 3/84* | (2006.01) |
| *B01D 11/02* | (2006.01) |
| *C01B 3/12* | (2006.01) |
| *C10J 3/46* | (2006.01) |

(52) U.S. Cl.
CPC ............. *C10J 3/84* (2013.01); *B01D 11/0288* (2013.01); *C01B 3/12* (2013.01); *C10J 3/463* (2013.01); *C01B 2203/0283* (2013.01); *C01B 2203/063* (2013.01); *C01B 2203/0805* (2013.01); *C01B 2203/14* (2013.01); *C10J 2300/0906* (2013.01); *C10J 2300/0989* (2013.01); *C10J 2300/1625* (2013.01); *C10J 2300/1675* (2013.01); *C10J 2300/1884* (2013.01)

(58) Field of Classification Search
CPC ......... C10J 3/84; C10J 3/463; B01D 11/0288; C01B 3/12
USPC ......................................................... 423/22
See application file for complete search history.

(56) References Cited

U.S. PATENT DOCUMENTS

| | | | |
|---|---|---|---|
| 4,432,949 A | 2/1984 | Hubred et al. | |
| 4,514,369 A | 4/1985 | Hubred et al. | |
| 4,544,533 A | 10/1985 | Marcantonio | |

(Continued)

FOREIGN PATENT DOCUMENTS

| | | |
|---|---|---|
| CA | 2774169 A1 | 10/2012 |
| WO | 2012004284 A2 | 1/2012 |

OTHER PUBLICATIONS

International Preliminary Report on Patentability in corresponding International Patent Application No. PCT/US20/58531 dated May 19, 2022. 8 pages.

(Continued)

*Primary Examiner* — Melissa S Swain
(74) *Attorney, Agent, or Firm* — Leason Ellis LLP

(57) ABSTRACT

An integrated refinery process for the disposal of metal-containing spent coked catalyst from hydrotreating and/or hydrocracking unit operations includes introducing the spent coked catalyst into a membrane wall gasification reactor in the form of flowable particles along with predetermined amounts of oxygen and steam based upon an analysis of the hydrocarbon content of the coke, and optionally, a liquid hydrocarbon; gasifying the feed to produce synthesis gas and a slag material; recovering and subjecting the slag material to further processes in preparation for a leaching step to solubilize and form one or more active phase metal compounds that are recovered from the leaching solution, either separately by sequential processing, or together. The recovered active metal compounds can be used, e.g., in preparing fresh catalyst for use in the refinery's hydroprocessing units.

24 Claims, 2 Drawing Sheets

(56) References Cited

U.S. PATENT DOCUMENTS

| | | | |
|---|---|---|---|
| 4,670,229 | A | 6/1987 | Wiewiorowski et al. |
| 8,974,701 | B2 | 3/2015 | Koseoglu et al. |
| 9,359,917 | B2 | 6/2016 | Koseoglu et al. |
| 2007/0025899 | A1 | 2/2007 | Marcantonio |
| 2013/0028834 | A1 | 1/2013 | Koseoglu |
| 2013/0067815 | A1 | 3/2013 | Koseoglu et al. |

OTHER PUBLICATIONS

International Search Report and Written Opinion in corresponding International Patent Application No. PCT/US20/58531 dated Feb. 26, 2021. 10 pages.

Marafi et al., Spent hydroprocessing catalyst management: A review Part II. Advances in metal recovery and safe disposal methods. Resources, Conservation and Recycling, 2008, 1-26, vol. 53.

Marafi et al., Refining Waste Spent Hydroprocessing Catalyst and Their Metal Recovery. International Journal of Energy and Environmental Engineering, 2017, 918-922, vol. 1. No. 10.

Francesco Ferella et al., Oil Refining spent catalyst: A review of possible recycling technologies. Resources, Conservation and Recycling, 2016, 10-20, vol. 108.

Ata Akcil et al., A review of metal recovery from spent petroleum catalyst and ash. Waste Management, 2015, 420-433, vol. 45.

Mohammed F. Hamza et al., Metal valorization from the waste produced in the manufacturing of Co/Mo catalysts: eaching and selective precipitation. Journal of Material Cycles and Waste Management, 2018, https://doi.org/10.1007/s10163-018-0811-9.

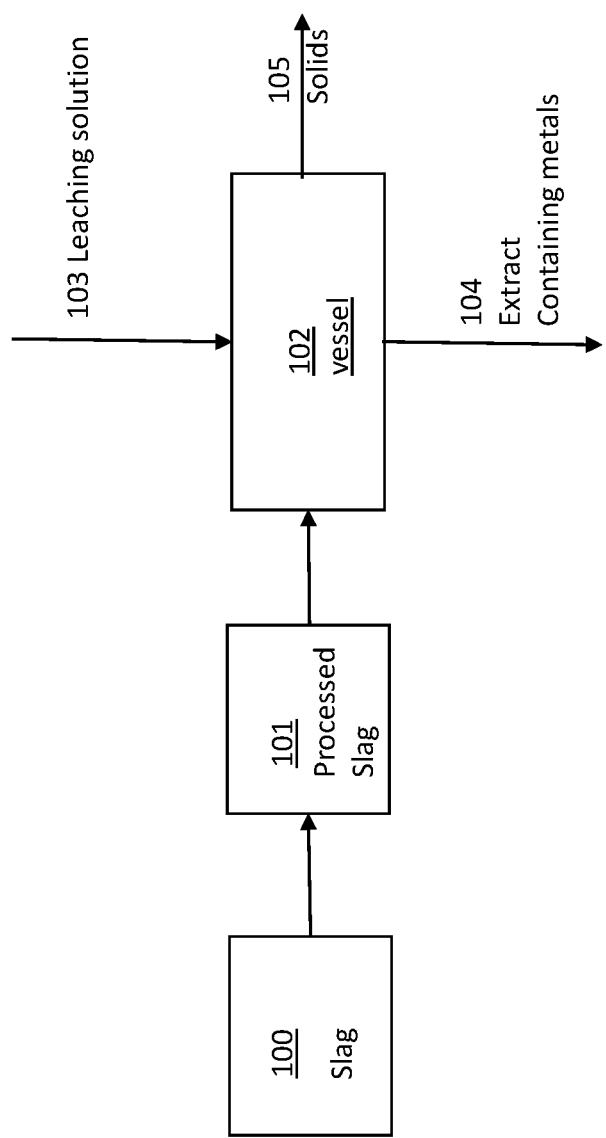

SYNGAS PRODUCTION AND RECOVERY OF ACTIVE PHASE METALS FROM GASIFIER SLAG CONTAINING SPENT CATALYST

BACKGROUND OF THE INVENTION

Field of the Invention

This invention relates to an integrated environmentally acceptable process for disposing of spent catalysts that produces synthesis gas and includes the recovery of active metals present in the spent catalysts.

Description of Related Art

Hydrotreating, hydrocracking and fluid catalytic cracking (FCC) catalysts are essential to the efficient functioning of these important unit operations in the refining of petroleum. Hydrotreating and hydrocracking catalysts are used to improve the yield of high-quality light oil fractions from heavier crude oil and petroleum feedstocks containing high levels of impurities. FCC catalysts improve the yield of higher-octane gasoline from crude oil. Common feedstocks subjected to treatment with FCC catalysts are straight run or hydrotreated vacuum gas oil and atmospheric residue hydrocarbons boiling above 370° C.

Catalysts typically employed in commercial petroleum refining applications today comprise supports, which are often composed of materials such as silica, alumina, zirconia, clay, or some hybrid of these. Some of the most commonly used supports are microporous aluminosilicate minerals or zeolites, mainly Faujasite or Y-zeolite. Much of the actual catalytic activity is imparted by active phase metals such as nickel, molybdenum, tungsten and cobalt that are impregnated on the support. For some processes, catalysts containing platinum and palladium are useful.

Hydrotreating and hydrocracking catalysts are susceptible to irreversible deactivation caused by adsorption of sulfur and nitrogen, by metal impurities such as naturally-occurring nickel and vanadium porphyrins that are present in the feedstock to be treated, and by the formation on the catalyst of carbonaceous deposits commonly referred to as coke. The gradual buildup of these impurities on hydrotreating or hydrocracking catalysts eventually plugs the pores and deactivates or poisons the catalyst. Nickel and vanadium porphyrins occurring naturally in the crude oil adversely affect the behavior of cracking catalysts, reducing product yields and quality. The number of cycles for a catalyst system depends upon the process in which they are used, the feedstock processed and the catalyst type. For example, in a typical hydroprocessing system, a catalyst bed can be reactivated to something less than 100% of its original or prior catalytic activity, each regeneration step leading to a diminishing return of activity. Eventually, the reduced activity of heavily coked catalyst renders its continued use uneconomical, and the entire bed must be replaced.

Replacing deactivated catalysts represents a significant cost in petroleum refining. Equally important are the costs and potential liabilities associated with treating and disposing of spent catalysts. For example, many countries including the U.S. have listed spent hydrotreating and hydrocracking catalysts as hazardous wastes. FCC catalysts, though more easily disposed of as road-base or as filler in asphalt and cement, remain an economic concern to refinery operators mainly because of the large volumes of the spent catalysts that are removed from the reactors.

For these reasons, various methods have been practiced in the art to extend the useful life of a catalyst, and when regeneration is not practical or possible, to dispose of the catalyst in an environmentally acceptable manner.

In the FCC unit operation regeneration method, the coked catalyst continuously transferred to the regenerator where it is contacted with an oxygen-containing gas at elevated temperatures in the regenerator to remove carbonaceous deposits and poisons on the catalyst support by high temperature combustion that produces gaseous oxides of carbon, and if present in the feed, of sulfur and nitrogen, and raises the temperature of the catalyst to promote the endothermic reaction. During the continuous operation of the FCC unit, a portion of the catalyst circulating in the system is withdrawn and replaced by fresh catalyst.

A known method for disposal of spent catalysts is the partial oxidation gasification of the spent catalyst with a low value hydrocarbon stream under predetermined conditions to produce synthesis gas. In general, the gasification process uses partial oxidation with stoichiometric quantities of oxygen and/or air and steam at a high temperature, i.e., greater than 800° C. to convert carbonaceous materials, such as coal, petroleum, biofuel, or biomass into synthesis gas, or syngas, consisting of carbon monoxide and hydrogen that can be used in the downstream manufacture of various chemicals, such as methanol via known synthesis processes and to make synthetic fuels via the Fischer-Tropsch process. In an integrated process, the hot syngas can be heat exchanged to produce superheated steam for use in the efficient generation of electricity.

The major benefits for a refinery using a heavy residue gasification process are that it can provide a source of hydrogen for hydroprocessing to meet the demand for light hydrocarbon products; the excess heat values can be used to produce electricity and steam for refinery use or for export and sale; it can take advantage of efficient power generation technology as compared to conventional technologies that combust the heavy residue; and it produces lower pollutant emissions as compared to conventional technologies that combust heavy residues as a means of disposal. Furthermore, the gasification process provides for the local disposition of the heavy residues where they are produced, thus avoiding the transportation costs for off-site disposal and/or storage; it also provides the potential for disposal of other refinery waste streams, including hazardous materials. Gasification can also be adopted as part of a carbon management program, i.e., carbon dioxide capture if required by the local regulatory system.

The three principal types of gasifier technologies are moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 900° C. to 1700° C.

There are two types of gasifier wall construction: refractory and membrane. The gasifier conventionally uses refractory liners to protect the reactor vessel from corrosive slag, thermal cycling, and elevated temperatures that range from 1400° C. up to 1700° C. The refractory is subjected to the penetration of corrosive components from the generation of the synthesis gas and slag and thus subsequent reactions in which the reactants undergo significant volume changes that result in strength degradation of the refractory materials. The replace spent of refractory linings can cost several millions of dollars a year and several weeks of downtime for a given reactor. Up until now, the solution has been the installation of a second or parallel gasifier to provide the necessary continuous operating capability, but the undesirable consequence of this duplication is a significant increase in the capital costs associated with the unit operation.

Membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; an improved average on-stream time of 90%, as compared to an on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

In a membrane wall gasifier, the build-up of a layer of solidified mineral ash slag on the wall acts as an additional protective surface and insulator to minimize or reduce refractory degradation and heat losses through the wall. The water-cooled reactor design also avoids what is termed "hot wall" gasifier operation, which requires the construction of thick multiple-layers of expensive refractories which are subject to degradation. In the membrane wall reactor, the slag layer is renewed continuously with the deposit of solids on the relatively cool surface. Further advantages include shorter start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels, but not with liquid fuels.

The gasification reactor is operated to produce synthesis gas and the downstream production of liquid fuels and petrochemicals. The key operating parameter is the mole ratio of hydrogen-to-carbon monoxide in the dry syngas. The ratio is preferably between 0.85:1 and 1.2:1, depending upon the characteristics of the feedstock. Additional treatment of the syngas is needed to increase this ratio of hydrocarbon-to-carbon to 2:1 for Fischer-Tropsch applications, or to produce additional hydrogen through the water-gas shift reaction represented by $CO+H_2O \rightarrow CO_2+H_2$. In some cases, part of the syngas is burned together with some of the off gases in a combined cycle to produce electricity and steam. The overall efficiency of this process is between 44% and 48%.

A process is described in U.S. Pat. No. 9,056,771 for the gasification of heavy residue bottoms recovered from a slurry hydrocracking process that include solid heterogenous catalyst particles. The heavy residue bottoms are introduced into a membrane wall gasification reactor in the form of a flowable slurry to produce synthesis gas. Some or all of the slag material resulting from the gasification can optionally be recycled to the hydrocracking zone since it possesses some catalytic activity.

A slurry hydrocracking process is described in Canadian Application 2774169 with the recovery of active metal(s) from the spent catalyst particles and any other metals present in the feedstock using a gasification step. After the hydrocracking process the entire slurry effluent containing the particulate catalyst is subjected to distillation and separated into fractions based on boiling ranges. The residual fraction from the separation containing the slurred catalyst particles is subjected to vacuum distillation and the vacuum residue is subjected to gasification. The slag recovered is subjected to an acidic and/or basic leaching step to solubilize the metals for separation and eventual recovery via precipitation.

The ash/slag produced during the gasification step will contain naturally-occurring contaminant metals present in the original hydrocarbon feedstock that have not been removed in a separate catalytic hydrodemetallizing step. The presence of these complex metals complicates the recovery of contaminant-free active phase metals from the gasification reactor slag.

The problem addressed by the present disclosure is to provide an improved method for disposing of spent coked catalysts in a partial oxidation gasification process for production of syngas that also includes the recovery of active metal compounds, and optionally, the recovery of a solid by-product that has utility as a basic construction material.

As used in the description, the terms "catalyst" and "catalysts" may be used interchangeably for convenience to refer to a single type of catalyst or a mixture of catalysts recovered from a reactor, or a mixture of catalysts that are recovered from two or more different processes that are accumulated in a collection vessel for combined processing in the gasifier.

As used in this description and in the claims, the term "grinding" is intended to include crushing, pulverizing, granulating, milling, grinding and comparable forms of material treatment to convert the original catalyst forms to a flowable particulate state for introduction into a gasification reactor.

SUMMARY OF THE INVENTION

The present disclosure broadly comprehends a process for disposal of metal-containing spent coked catalysts, or spent coked catalysts and residual oil recovered from refinery or petrochemical catalytic processes by the partial oxidation of the feedstream containing the spent coked catalyst in a membrane wall gasification reactor to produce hydrogen and carbon monoxide, i.e., synthesis gas, and the recovery of the by-product slag from which the active metals are extracted by one or more predetermined effective leaching processes, with the remaining solid catalyst support material containing aluminum oxides(s) being suitable for use as a component in the production of cement.

Heavily coked catalyst supports can contain sufficient carbonaceous deposits to participate in the gasification reactions to produce syngas. The stoichiometric amounts of oxygen and steam required are predetermined by analyzing representative samples of the catalyst or mixture of catalysts. Methods for determining the amount of coke deposited on the spent catalyst include for example temperature programmed oxidation (TPO) and thermogravimetric analysis (TGA).

In accordance with an embodiment, an integrated refinery process for the gasification of an active metal-containing spent coked catalyst for the production of synthesis gas and the recovery of active metal compounds includes the steps of:

a. providing a spent coked catalyst and contains one or more active phase metals selected from the group consisting of Ni, Co, Mo, W, Pt and Pd;
b. grinding the spent coked catalyst to produce a free-flowing mass of ground catalyst particles;
c. mixing the ground spent catalyst particles with a fluid carrier stream to form a pressurized fluidized spent catalyst particulate feedstream;
d. injecting the pressurized fluidized spent catalyst particulate feedstream into the combustion chamber of a cold-wall tubular membrane wall partial oxidation gasification reactor in the presence of a predetermined amount of oxygen and steam;
e. operating the gasification reactor at a temperature in the range of 900° to 1700° C. and a pressure from 20 to 100 bars;
f. subjecting the feedstock to partial oxidation to produce hydrogen, carbon monoxide and a slag material comprising the remnants of the catalyst support material containing the active metals;
g. recovering the hydrogen and carbon monoxide from the reactor in the form of a hot synthesis gas;
h. recovering the slag material from the reactor;
i. preparing the slag material for leaching;
j. contacting the prepared slag material with an aqueous leaching solution to solubilize one or more active phase metals in the aqueous leaching solution; and
k. recovering the one or more solubilized active phase metals from the leaching solution.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview and framework for understanding the nature and character of the claimed features and embodiments. The accompanying drawings are included to provide illustration and a further understanding of the various aspects and embodiments. The drawings, together with the remainder of the specification, serve to explain principles and operations of the described and claimed aspects and embodiments.

BRIEF DESCRIPTION OF THE DRAWINGS

The foregoing summary, as well as the following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and apparatus shown. In the drawings the same numeral is used to refer to the same or similar elements, in which:

FIG. 2 is a schematic diagram illustrating the steps of processing the slag obtained from the gasification of the spent catalyst in accordance with the invention;

DETAILED DESCRIPTION OF THE INVENTION

Figure 1:
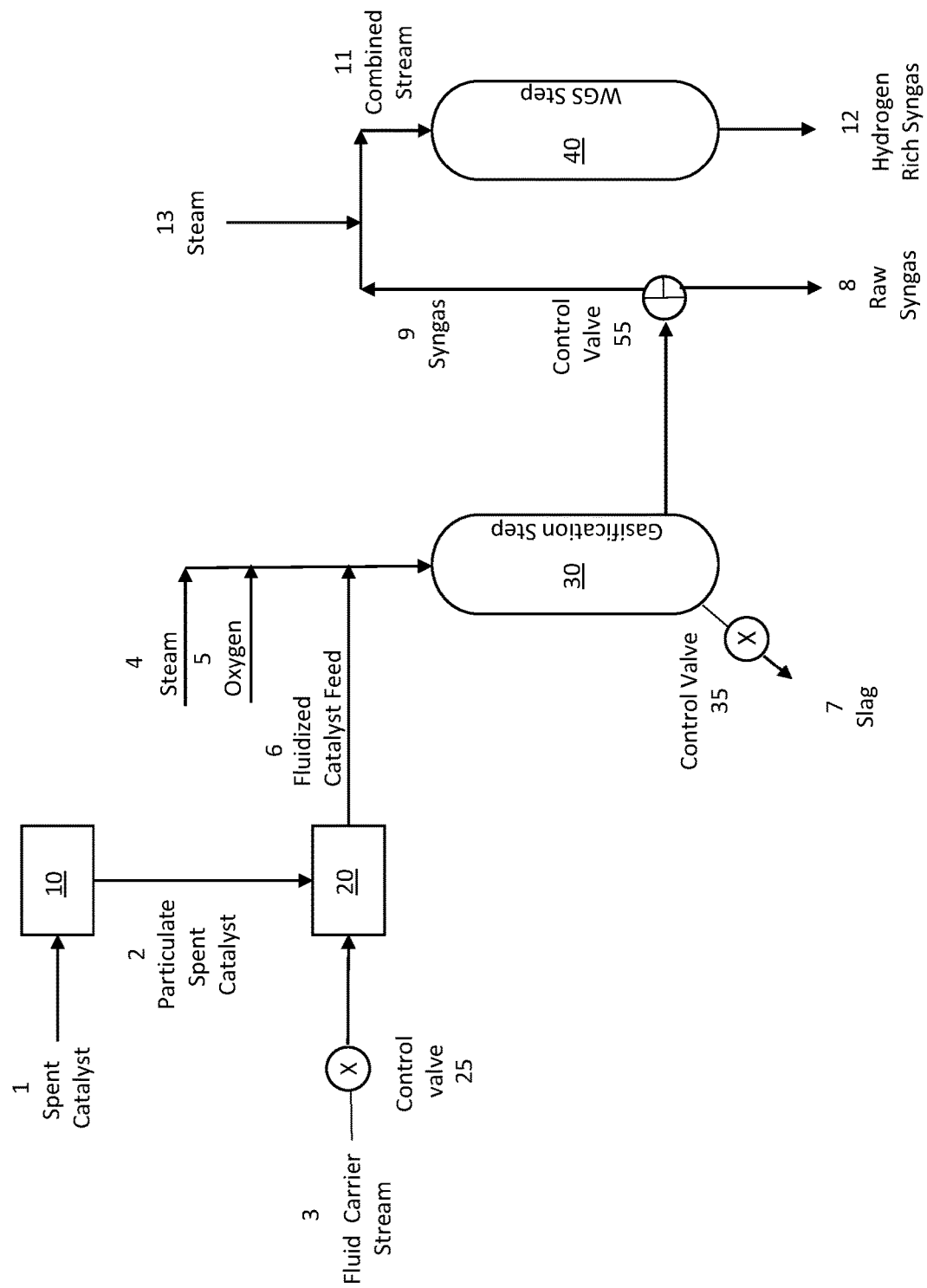
FIG. 1 is a schematic diagram of an embodiment of the method of processing of spent catalyst in accordance with the invention.

An embodiment of the process in accordance with the present disclosure will be described with reference to FIG. 1. The spent coked catalyst 1 as recovered from a hydroprocessing unit operation (not shown) is processed in spent catalyst preparation apparatus 10 to provide a flowable particulate spent catalyst feed 2 that is introduced into mixing zone 20. A fluid carrier stream 3 is introduced into the mixing zone via a control valve 25 and mixed with the particulate spent catalyst feed 2 to form a fluidized catalyst feed 6. The fluidized catalyst feed 6 is discharged from the mixing zone and introduced into the partial oxidation gasification reaction zone 30 with a predetermined amount of steam 4 and oxygen that are based on hydrocarbon content of the feed.

The partial oxidation reaction proceeds in gasification zone 30 in which the molten ash component produced contacts the water-cooled sides of the membrane wall reactor to form solid and liquid slag at the surface. The liquid slag material flows downwardly and is recovered at the base 7 of the gasification zone 30 where it can be withdrawn via control valve 35. The hot raw syngas 8 produced in the gasification zone 30 can be withdrawn via three-way control valve 55 for further processing, or use in other downstream processes.

In a preferred embodiment of the present invention, some or all of the syngas 9 passes via three-way control valve 55 to a water-gas shift ("WGS") reaction zone 40. Upstream of the WGS reaction zone, steam 13 is mixed with the syngas and the mixture 11 is introduced into WGS reaction zone 40. The carbon monoxide component of the syngas reacts with the water molecules in the steam to produce hydrogen and carbon dioxide in the WGS reactor. The shifted syngas product, now having a significantly higher concentration of hydrogen is recovered as product 12. Thus, in accordance with the process of the invention, valuable end products, e.g. syngas and/or hydrogen are obtained from a spent catalyst and, optionally, residual oils.

Catalyst

The coked solid spent heterogeneous catalyst used in the feed for the gasification reaction can include one or more catalytically active metal components selected from Groups 4-12 of the Periodic Table. In certain embodiments, the active metal component is one or more of iron, nickel, molybdenum, vanadium, tungsten, cobalt, ruthenium, rhodium, rhenium, iridium platinum and palladium. The catalytically active metal can be present as a solid particle in elemental form or as a metal compound, e.g., an oxide or sulfide. One or more active metal component(s) are typically deposited on or otherwise incorporated in a support, which can be amorphous and/or structured. Supports include alumina, silica-alumina, silica, titania, titania-silica or titania-silicates. The active metal component(s) are incorporated in an effective concentration, for instance, in the range of 1-40, 1-30, 1-10, 1-5, 2-40, 2-30, 2-10, 3-40, 3-30 or 3-10 wt % based on the mass of the oxides, sulfides or metals relative to the total mass of the catalysts.

Catalysts subjected to the gasification process in accordance with the invention are those derived from hydroprocessing of feedstocks that preferably do not contain contaminant metals, in particular Ni and V that can naturally occur in the crude oil. The catalyst(s) used in the gasification step are therefore preferably free of any contaminant metals.

Examples of hydrocarbon feedstocks that are free of contaminant metals are naphtha and diesel, as well as VGO and vacuum residue from which contaminant metals have been removed by a hydrodemetallization treatment prior to the hydrotreating/hydrocracking process with the catalyst.

As will be understood by those of ordinary skill in the art, the spent coked catalyst can contain varying amounts of the hydrotreated/hydrocracked feedstock or its derivatives or other reaction products when subjected to the grinding step, depending on the nature of the feedstock, the specific nature of the hydroprocessing operation used, and the process used for separating the catalyst from the feedstock. For example, after separation from the treated feedstock by filtration and/or sedimentation, residual amounts of the feedstock may be present on the catalyst.

The spent coked catalyst separated from the feedstock by sedimentation and/or filtration can be subjected to a further flushing step with a solvent. In this way, spent catalyst that is substantially free of the feedstock can be prepared prior to the grinding step.

In an embodiment, the spent coked catalyst is recovered from hydrocracking VGO, where spent catalyst is present in the heavy residue bottoms portion that results after separation of the converted products. The viscosity of the mixture of the heavy bottoms and coked solid spent catalyst can be affected by various factors, including the nature of the original feedstream, the extent of recycled materials present and the physical characteristics of the catalyst(s) used in the hydrocracking process. If the mixture of spent coked catalyst and heavy bottoms is a solid at ambient temperature, it can be dried and then subjected to the grinding step.

Fluid Carrier Stream

The fluid carrier stream 3 can comprise gas, such as air, nitrogen, carbon dioxide, carbon monoxide, syngas, hydrogen, steam, nitrogen-free gas, low-oxygen gas, oxygen-free gas, and/or a combination of these carrier fluids. Optionally, intermediate refinery streams such as liquid cycle oils from an FCC process can be used as the fluid carrier stream for the flowable catalyst material.

In certain embodiments, the fluid carrier stream can consist of or contain a light petroleum fraction boiling in the range 36-370° C. In another embodiment the fluid carrier stream can comprise residual oil boiling above 370° C.

Operating Conditions for Gasification Reactor

The operating conditions for the membrane wall gasification reactor include a temperature in the range of from 900° C. to 1800° C.; a pressure in the range of from 20 bars to 100 bars; a mole ratio of oxygen-to-carbon content of the feed in the range of from 1:1 to 5:1; a mole ratio of steam-to-carbon content of the feedstock in the range of from 0.1:1 to 10:1. The properties of the synthesis gas subjected to the water gas shift reaction are a temperature in the range of from 150° C. to 400° C.; a pressure in the range of from 1 bar to 60 bars: and a mole ratio of water-to-carbon monoxide in the range of from 5:1 to 3:1.

In certain embodiments, the amounts of catalyst and, if present, a liquid hydrocarbon are adjusted so that gasification of the mixture results in a sufficient amount of slag to form a protective coating on the sidewalls of the membrane wall reactor. The minimum amount of ash-forming material in the feedstock is at least 2 W %, and the ash-forming material can be present in the range of from 2 W % to 10 W % for the efficient operational performance of the reactor.

In certain embodiments, the spent coked catalyst introduced into the membrane wall gasification reactor is substantially free of any hydrocarbon oils derived from the feedstock and the stoichiometric amounts of oxygen and steam are adjusted as a function of the composition and amount of coke deposited on the spent catalyst.

Referring now to FIG. 2, there is provided a simplified schematic illustration of the process for the recovery of active metal(s) from the slag recovered following the gasification step. The metal-containing slag 100 recovered from gasification reactor is processed, e.g., by grinding, pulverizing or otherwise breaking it into pieces to facilitate the leaching step. The processed slag material 101 is preferably of a particle size in the range of 30 to 65 Tyler screen mesh.

The pulverized slag particles 101 are then introduced into the leaching vessel 102. A leaching solution 103 is introduced to vessel 102 to leach the active phase metals or metal compounds. The extract stream 104 containing metal compounds and any remaining solids 105 are discharged from the leaching vessel 102 and are sent to downstream processes (not shown) to recover the active metal compounds and, optionally, solid material.

The operating conditions, fluids and/or extraction methods used for the various metals are well known in the art and practiced industrially as described, for example, in Marafi et al, Resources, Conservation and Recycling 53 (2008), 1-26, U.S. Pat. Nos. 4,432,949, 4,514,369, 4,544,533, 4,670.229 and US2007/0025899. The various known routes for extraction of metals include leaching by acidic and/or basic solutions, by ammonium or ammonium salts, by bio-leaching with microorganisms, by low temperature heat treatment (roasting), by sodium or potassium salts, by chlorination or by recovering metals electrolytically. Leaching with acids may be carried out using inorganic acids, e.g, HCl, $H_2SO_4$, $HNO_3$ or organic acids, e.g., oxalic acid, lactic acid, citric acid, glycolic acid, phthalic acid, malonic acid, succinic acid, salicylic acid, tartaric acid, and others. In general, for basic leaching, ammonia, ammonium salts, sodium hydroxide or $Na_2CO_3$ is used. In both cases, oxidizing agents, e.g., $H_2O$, $Fe(NO_3)_3$ and $Al(NO_3)$ can be present to facilitate extraction. Once the metals are in solution, they can be isolated by selective precipitation, e.g., at different pHs and/or with different agents and/or by extraction agents, e.g., oximes and beta-diketone. Preferably, the step for extraction of the metals or metal compounds of the invention comprises leaching with at least one acidic and/or basic solution.

In an embodiment, the leaching solution 102 is an aqueous basic solution of one of ammonium hydroxide, ammonium carbonate, ammonium persulfate or sodium hydroxide at a respective concentration in the range from 0.1 M-6 M.

In another embodiment the leaching solution is an aqueous acidic solution of one of sulfuric acid, sulfonic acid, nitric acid, hydrochloric acid, acetic acid and citric acid at a respective concentration in the range from 5%-98% with a pH in the range from 2-3.

The leaching process can be conducted at a temperature in the range of from 25° C. to 90° C. Determination of the optimum operating conditions are within the skill of the art and will vary with the metals to be solubilized and the composition of the entraining slag.

EXAMPLES

The following examples illustrate specific embodiments of this disclosure.

Example 1

A 1000 kg sample of a dried particulate spent coked catalyst containing 15 W % of carbon, 1.00 W % of hydrogen, 5 W % of sulfur, 0.30 W % of nitrogen and 78.70 W % of ash-producing material was gasified in a membrane wall gasification reactor at 1045° C. The ratio of water-to-carbon was 0.6:1 by weight. The ratio of oxygen-to-carbon was 1:1 by weight. The hot raw syngas was sent to a water-gas shift reaction zone with steam to increase the hydrogen yield in the product. The water-gas shift reaction zone was operated at 318° C. and 1 bar. The mole ratio of steam-to-carbon monoxide was 3:1, and a total of 24 kg of hydrogen was recovered following the water-gas shift reaction.

Example 2

A 200 kg sample of the spent coked catalyst of Example 1 was blended with 800 kg residual oil containing 84.3 W % of carbon, 10.43 W % of hydrogen, 4.25 W % of sulfur and 1.00 W % of nitrogen and then the mixture was gasified in a membrane wall gasification reactor at 1045° C. The ratio of water-to-carbon was 0.6:1 by weight. The ratio of oxygen-to-carbon was 1:1 by weight. The raw syngas and steam were sent to a water-gas shift (WGS) reaction zone to increase the hydrogen yield. The water-gas shift reaction zone was operated at 318° C. and 1 bar. The mole ratio of the steam-to-carbon monoxide was 3:1, and a total of 158 kg of hydrogen was recovered after the WSG reaction.

The process of the invention has been described in detail above and with reference to the drawings. Additional variations and modifications will be apparent from this description to those of ordinary skill in the art and the scope of protection is to be determined by the claims that follow.

The invention claimed is:

1. An integrated refinery process for the gasification of an active metal-containing spent coked catalyst for the production of synthesis gas and the recovery of active metal compounds, the process comprising:
   a. providing an active metal-containing spent coked catalyst, containing one or more active phase metals from the periodic table IUPAC group 4-12 deposited on or otherwise incorporated in an amorphous and/or structured support, wherein the spent coked catalyst provided in step (a) is substantially free of vanadium and nickel porphyrin compounds and is derived from hydroprocessing of a feedstock that is a fraction of crude that does not contain contaminant metals vanadium and nickel that naturally occur in the crude oil, said feedstock selected from the group consisting of naphtha, diesel, vacuum gas oil that has been subjected to hydrodemetallization treatment prior to hydroprocessing, and vacuum residue that has been subjected to hydrodemetallization treatment prior to hydroprocessing;
   b. grinding the spent coked catalyst to produce a free-flowing mass of ground spent catalyst particles;
   c. mixing the ground spent catalyst particles with a fluid carrier stream to form a pressurized, fluidized spent catalyst particulate feedstream;
   d. injecting the fluidized spent catalyst particulate feedstream into the combustion chamber of a cold-wall tubular membrane wall partial oxidation gasification reactor in the presence of a predetermined amount of oxygen and steam;
   e. operating the gasification reactor at a temperature in the range of from 900° to 1700° C. and a pressure from 20 to 100 bars;
   f. subjecting the fluidized spent catalyst particulate feedstream to partial oxidation to produce hydrogen and carbon monoxide from the spent coked catalyst, and a slag material comprising the remnants of the spent coked catalyst containing the active metal compounds;
   g. recovering the hydrogen and carbon monoxide from the reactor in the form of a hot synthesis gas;
   h. recovering the slag material from the reactor as a solid material;
   i. preparing the slag material for leaching;
   j. contacting the prepared slag material with an aqueous leaching solution to solubilize the one or more active phase metals in the leaching solution;
   k. separating the leaching solution containing the one or more solubilized metal compounds from any remaining solid depleted slag material; and
   l. recovering the one or more solubilized active phase metal compounds from the leaching solution.

2. The process of claim 1, wherein the spent coked catalyst provided in step (a) is substantially free of any hydrocarbon oils derived from the feedstock, the method further comprising adjusting the amount of oxygen and steam as a function of a composition and amount of coke deposited on the spent catalyst.

3. The process of claim 1, wherein the one or more active phase metals are selected from the group consisting of Ni, Co, Mo, W, Pt and Pd.

4. The process of claim 1, wherein the one or more active phase metals recovered in step (l) is selected from the group consisting of cobalt, molybdenum, tungsten, nickel, platinum and palladium.

5. The process of claim 1, where more than one metal or metal compound is present in the slag, and each metal compound is solubilized in the leaching solution separately.

6. The process of claim 1, wherein the leaching solution is an acid leaching solution comprised of an acid is selected from the group consisting of sulfuric acid, sulfonic acid, nitric acid, hydrochloric acid, acetic acid, citric acid, and combinations thereof.

7. The process of claim 1, wherein the leaching solution is a basic leaching solution comprised of a member of the group consisting of ammonium hydroxide, ammonium carbonate, ammonium persulfate and sodium hydroxide, and combinations thereof.

8. The process of claim 1, wherein depleted slag material remains in the leaching solution following the recovery of the one or more metal compounds in step (l) and the depleted slag material is (a) recovered and treated to remove and/or neutralize any remaining leaching solution, and (b) dried to form a flowable particulate material for subsequent processing.

9. The process of claim 1, wherein a hydrocarbon oil comprises the fluid carrier stream.

10. The process of claim 9, wherein the hydrocarbon oil comprises a light petroleum fraction boiling in the range of 36-370° C.

11. The process of claim 9, wherein the hydrocarbon oil comprises residual oil boiling above 370° C.

12. The process of claim 11, wherein the spent coked catalyst is fluidized in at least a portion of the residual oil to form the feedstream to the membrane reactor.

13. The process of claim 11, wherein the spent coked catalyst is mixed with the residual oil to form a uniform pumpable dispersion.

14. The process of claim 1, wherein the ash forming content of the spent coked catalyst particles is from 2 W % to 99 W % of the particulate feedstream.

15. The process of claim 1, wherein the fluid carrier stream is a gaseous feedstream.

16. The process of claim 15, wherein the gaseous feedstream contains a predetermined stoichiometric amount of oxygen.

17. The process of claim 15, wherein the gaseous feedstream is air.

18. The process of claim 1, further comprising controlling the amount of spent catalyst particles and oxygen entering the reactor to provide a stochiometric balance for partial combustion based on the hydrocarbon content of the catalyst particles and, if present, any residual hydrocarbon oil.

19. The process of claim 1, wherein the ratio of oxygen-to-carbon in the gasifier is from 0.5:1 to 10:1.

20. The process of claim 1, wherein the ratio of oxygen-to-carbon is from about 1:1 to 2:1 by weight.

21. The process of claim 1, wherein the ground spent catalyst particles range in size from those passing a 35 to a 65 Tyler mesh size screen.

22. The process of claim 1, further comprising passing the hot synthesis gas to a water-cooled heat exchanger to cool the synthesis gas, recovering high pressure steam from the heat exchanger, introducing the high pressure steam into a turbine generator to produce electricity, and recovering the cooled synthesis gas containing hydrogen.

23. The process of claim 1, in which the one or more active metal compounds recovered in step (k) are used to prepare fresh catalysts.

24. The process of claim 1, in which the one or more metals recovered are used to form alloys.

* * * * *